(No Model.) 6 Sheets—Sheet 1.
F. LJUNGSTROM.
STEAM GENERATOR AND CONDENSER.
No. 574,157. Patented Dec. 29, 1896.
FIG:1. FIG:2.
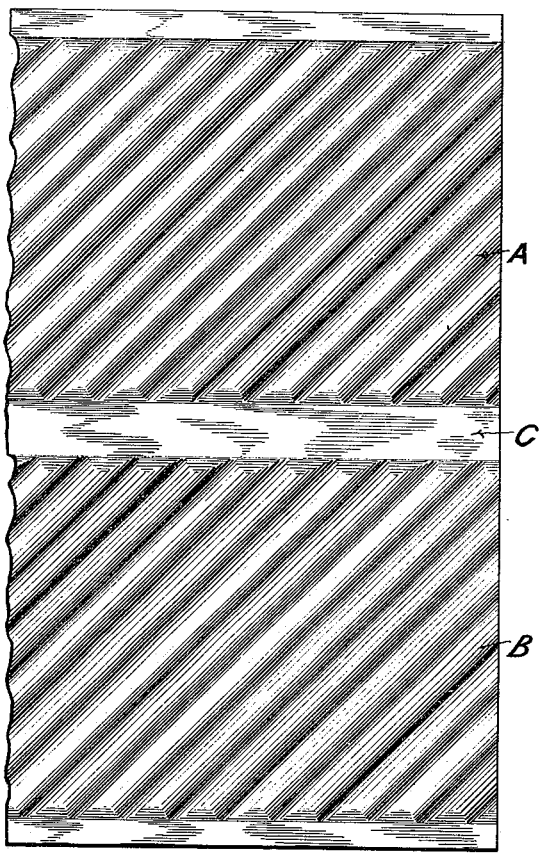 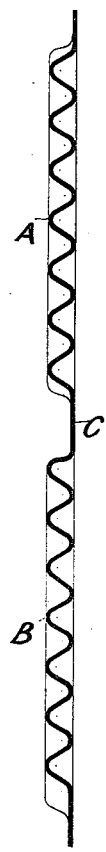
FIG:3. FIG:4.
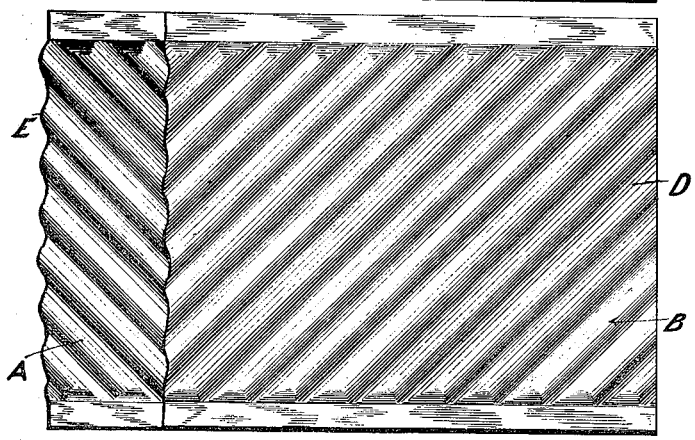 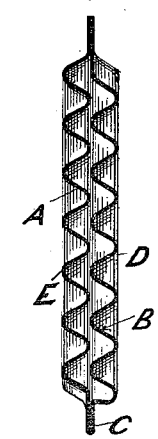

(No Model.)  6 Sheets—Sheet 2.
F. LJUNGSTROM.
STEAM GENERATOR AND CONDENSER.
No. 574,157.  Patented Dec. 29, 1896.
FIG: 5.
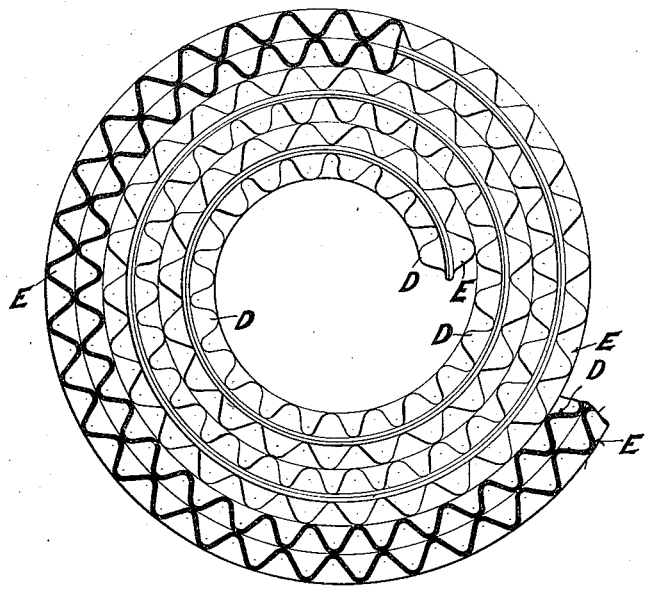
FIG: 6.  FIG: 7.
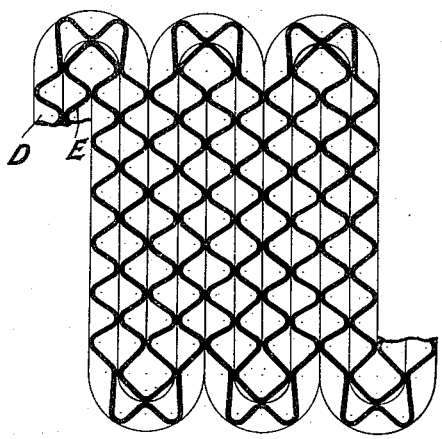 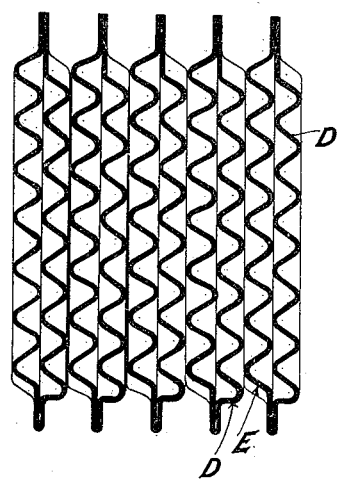

(No Model.) 6 Sheets—Sheet 3.
F. LJUNGSTROM.
STEAM GENERATOR AND CONDENSER.
No. 574,157. Patented Dec. 29, 1896.
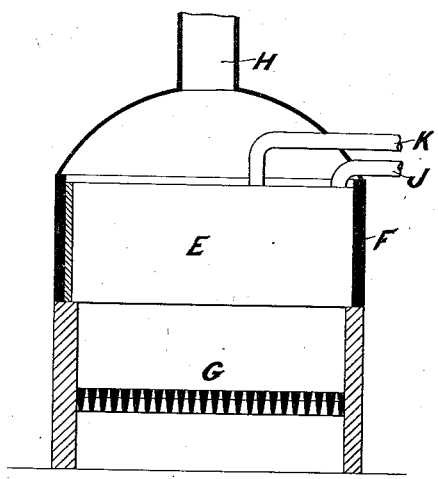
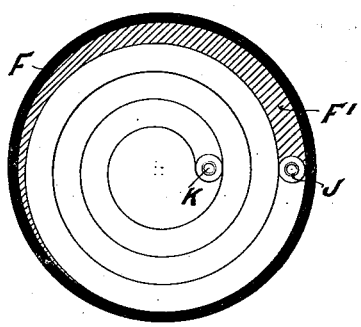
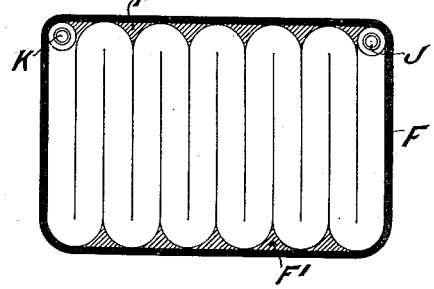
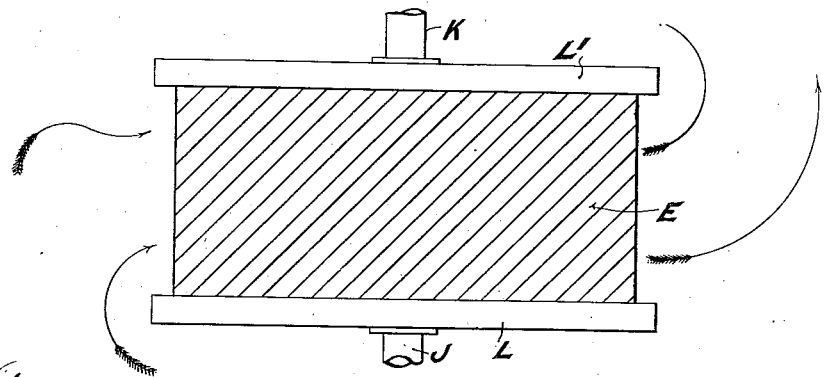
Witnesses
Chas H Smith
J. Staib
Inventor
F. Ljungstrom
L. W. Serrell & Son
Attys (No Model.) 6 Sheets—Sheet 4.
F. LJUNGSTROM.
STEAM GENERATOR AND CONDENSER.
No. 574,157. Patented Dec. 29, 1896.
*Fig: 13.*
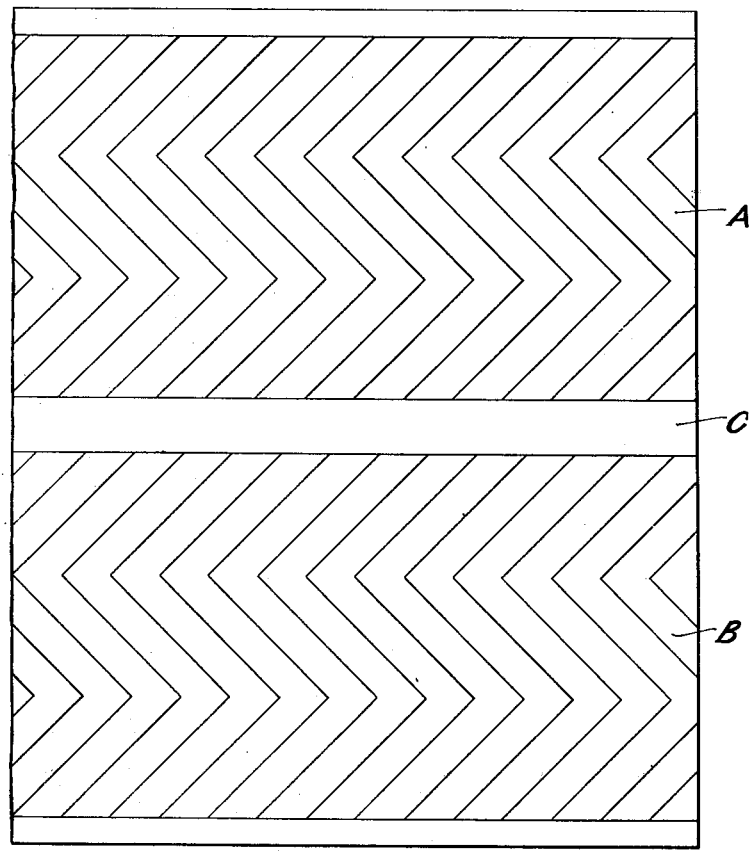
*Fig: 14.*

(No Model.) 6 Sheets—Sheet 5.
F. LJUNGSTROM.
STEAM GENERATOR AND CONDENSER.
No. 574,157. Patented Dec. 29, 1896.
FIG: 15.
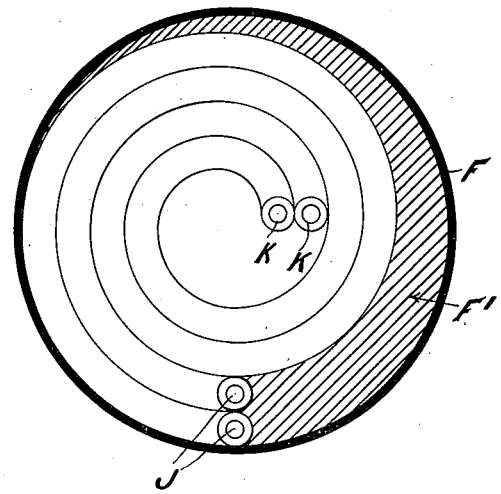
FIG: 16.
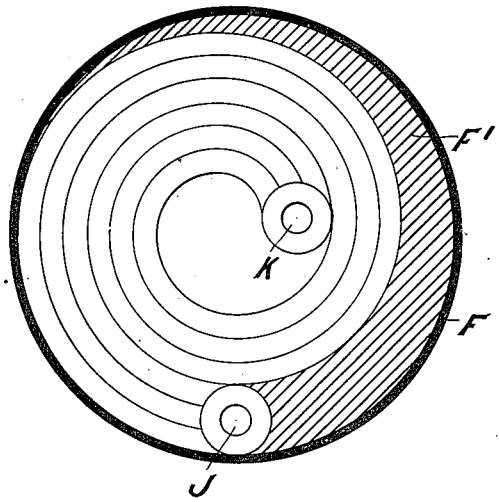

(No Model.) 6 Sheets—Sheet 6.
F. LJUNGSTROM.
STEAM GENERATOR AND CONDENSER.
No. 574,157. Patented Dec. 29, 1896.
FIG: 17.
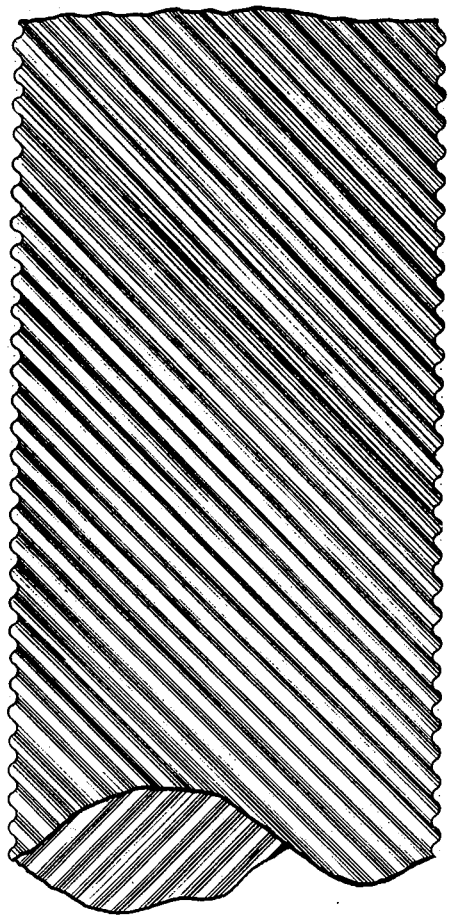
FIG: 18.

UNITED STATES PATENT OFFICE.

FREDRIK LJUNGSTROM, OF STOCKHOLM, SWEDEN.

STEAM GENERATOR AND CONDENSER.

SPECIFICATION forming part of Letters Patent No. 574,157, dated December 29, 1896.

Application filed June 19, 1896. Serial No. 596,118. (No model.) Patented in England December 10, 1895, No. 23,664.

*To all whom it may concern:*

Be it known that I, FREDRIK LJUNGSTROM, a subject of the King of Sweden and Norway, residing at Stockholm, in the Kingdom of Sweden, have invented new and useful Steam Generators and Condensers, (for which I have obtained a patent in Great Britain, No. 23,664, bearing date December 10, 1895,) of which the following is a specification.

My invention relates to steam generators and condensers composed, as hereinafter described, of corrugated, fluted, or ribbed metallic chambers, my object being to effect a more rapid production of steam than heretofore, or for more quickly heating or cooling gases and liquids.

Prior to my invention it has been proposed to employ corrugated plates in the construction of steam generators and condensers, and such corrugated plates have been arranged in pairs at a distance apart to form a connecting-chamber located between, say, two containers, and heat has been applied to the exterior surfaces of such a narrow chamber or chambers. Now, according to my invention, I form a chamber having two corrugated walls so arranged that the corrugations of one wall extend in diverse directions to the corrugations of the other wall, the apices of the corrugations being in internal contact at points, and I coil or fold such a chamber or chambers so that the corrugations are also in external contact at points and extend in diverse directions; or in other cases I arrange a number of such chambers in contact with each other externally and located, say, between containers. In this manner, as, for example, in connection with steam-generators, I obtain a divided water-space, the walls of which consist of a plurality of flutes, the spaces opening into each other at the crossing-points, and these water-spaces alternate with other similar, equal, and adjacent spaces, serving as conduits for the heating-gas, such as the hot gases from a furnace.

In the accompanying drawings, Figure 1 shows a corrugated plate in elevation. Fig. 2 is a cross-section of same. Fig. 3 shows the plate folded. Fig. 4 is a cross-section of same. Fig. 5 is a sectional plan of so much of a chamber of coiled form constructed or arranged according to my invention as will be necessary to describe same. Fig. 6 is a horizontal section showing a bent or folded construction. Fig. 7 is a cross-section showing a number of chambers arranged in contact one with another. Fig. 8 is a diagraphical elevation, partly in section, showing an application as a steam-generator of such an arrangement as is illustrated by Fig. 5; and Fig. 9 is a plan, partly in section, of the view shown at Fig. 8. Fig. 10 is a diagraphical view, similar to Fig. 8, showing an application of the arrangement illustrated at Fig. 6; and Fig. 11 is a plan view, partly in section, of Fig. 10. Fig. 12 is a side elevation showing an application of such an arrangement as is shown at Fig. 7. Fig. 13 shows a plate in elevation similar to that shown at Fig. 1, illustrating another arrangement of corrugations. Fig. 14 is a section of a ribbed plate, and Figs. 15 and 16 are plan views of modified forms of coiled chambers. Fig. 17 is a plan view of a helically-corrugated tube, and Fig. 18 shows the tube in cross-section when flattened and so that the interior corrugations are in contact and the corrugations of the two walls cross each other.

Referring to the accompanying drawings, the chamber may be constructed by placing two diversely-corrugated plates in contact and riveting or otherwise securing the edges, or a plate may be corrugated with the corrugations extending in one direction and one part of the plate folded upon the other part, or a tube may be helically corrugated and flattened until the two walls are in contact. In fact, I do not limit myself to the particular details of construction by which two plates diversely corrugated are or may be brought together. In order to illustrate my invention, I will describe a construction wherein I corrugate a sheet of metal, such as shown at Figs. 1 and 2, with the corrugations marked A and B. This strip or sheet of metal so corrugated is then bent longitudinally, say centrally of the uncorrugated part marked C, until the apices of the corrugations upon the adjacent interior surfaces of the walls composing the chamber come into actual contact, as is shown by Fig. 4, and the corrugations A will then extend in a diverse direction to the corrugations B, as illustrated by Fig. 3; that is, the flutes upon one wall D will cross the flutes upon the other wall E composing the chamber, and the corrugations will be in contact at their crossing-points, spaces being formed (between the plates) communicating with one another at the crossing-points of the corrugations. Such a chamber of a proper or suitable size and length, as described with reference to Figs. 3 and 4, is then coiled or bent into a spiral formation and in such manner that the apices of the corrugations on the exterior are brought into contact at points, while the corrugations extend in diverse directions, and such a coil as shown in plan view at Fig. 5 is or may be surrounded by a metal casing F or the like, such as is shown at Figs. 8 and 9 as applied to a steam-generator, and the metal casing F prevents the coil from yielding to the internal steam-pressure.

G is the furnace.

F' is a packing-piece of aluminium or other suitable metal or material.

The gases of combustion ascend within the spaces formed by the spiral windings to a chimney H on the upper part of the casing F, passing through the divided chambers and communicating passages adjacent to the similar interior water-spaces.

The boiler is or may be supplied with water from an inlet-pipe J, and the steam is drawn off by a suitable pipe K.

Instead of spirally coiling the chamber as described, the same characteristics may be maintained by other arrangements; that is, the chamber or chambers may be arranged so that the apices of the exterior corrugations of one part of the said chamber are brought into contact at points with the apices of the exterior corrugations of another part, either of the same chamber or of a similar chamber, and such adjacent exterior corrugations in contact extending in diverse directions. Thus such a chamber as described with reference to Figs. 3 and 4 may be bent or folded in "zigzag" fashion, as shown by the sectional plan, Fig. 6; that is, the chamber is folded in equal lengths and in alternate directions, and one fold lies on another fold, whereby the chamber (between the walls D and E) is composed of spaces intercommunicating throughout the several folds, while similar spaces are formed, exterior of the chamber, between the folds for the heating products.

Such a construction of apparatus as applied to a steam-generator may be conveniently located within a casing F, as, for example, is shown at Figs. 10 and 11, and spaces between the chamber and the casing F filled by packing-pieces F'.

J is the water-inlet.

K is the steam-pipe, and G is the furnace.

At Fig. 7 I have shown several of such chambers as described with reference to Figs. 3 and 4 arranged in contact one with another, thereby producing exactly the same results, i. e., similar water-spaces adjacent to symmetrically-arranged heating-spaces, as have been shown with reference to Figs. 5 and 6. This arrangement of chambers, Fig. 7, may be conveniently located between two containers L L', as, for example, is shown at Fig. 12, each chamber being in communication with both containers. The products of combustion then pass between the chambers in the direction indicated by the arrows.

As will be now well understood, the particular form or pitch of corrugations of the plates may be varied as desired. For example, the corrugations may be of zigzag character, as shown at Fig. 13, or the plate may be provided with projections or ridges, as shown by the sectional view, Fig. 14, or a tube, as shown at Fig. 17, helically corrugated may be flattened, as at Fig. 18, until the interior corrugations are brought into contact.

At Fig. 5 a single chamber is shown coiled spirally, but two or more chambers may be placed in contact one with another and likewise coiled spirally. Thus at Fig. 15 two such chambers are shown so coiled and surrounded by a casing F. F' is a packing-piece. Fig. 16 shows a coil of three such chambers.

When the apparatus is employed as a condenser, the steam to be condensed may pass within the walls of the chamber, while the cooling medium, air, for example, may pass between the chambers.

I claim as my invention—

1. In a generator or condenser the corrugated plates or walls between which are alternating chambers for fluids of different temperatures, the corrugations of one plate or wall crossing the corrugations of the other and so that the apices of the corrugations are in contact at the crossing-points in the adjacent walls and hence the corrugated walls rest upon and support each other throughout the structure without obstructing the passageways for the fluids within the chambers, substantially as set forth.

2. In steam generators or condensers three or more corrugated walls between which are two or more chambers, the corrugations of one wall being in a diverse direction to the corrugations of the adjacent walls and so that the apices of the corrugations of one wall are in contact at the crossing-points with the apices of the corrugations of the adjacent walls, these walls being laid in contact with each other so that the apices of the corrugations of the exterior surfaces of the said walls are brought into contact, the adjacent exterior corrugations extending in diverse directions thereby forming adjacent, equal and alternate communicating passages in each chamber for water or steam and for the heating or cooling fluids, and inlet and outlet tubes to and from such chambers, substantially as set forth.

3. In steam generators or condensers three or more corrugated walls between which are two or more chambers the corrugations of one wall being in a diverse direction to the corrugations of the adjacent walls and so that the apices of the corrugations of one wall are in contact at the crossing-points with the apices of the corrugations of the adjacent walls, these walls being laid in contact with each other so that the apices of the corrugations of the exterior surfaces of the said walls are brought into contact, the adjacent exterior corrugations extending in diverse directions, thereby forming adjacent, equal and alternate communicating passages in each chamber for water or steam and for the heating or cooling fluids and an inclosing exterior casing and inlet and outlet tubes to and from such chambers, substantially as set forth.

4. In steam generators or condensers, three or more corrugated walls between which are two or more chambers, the corrugations of the adjacent walls extending in diverse directions and the apices of the corrugations of one wall in contact at points with the apices of the corrugations of the adjacent walls, one such wall of the series being arranged in contact with the next adjacent wall so that the apices of the corrugations on the exterior surfaces of the walls are in contact at points while the exterior surface corrugations of one wall extend in diverse directions to the adjacent exterior corrugations of the next wall, thereby forming adjacent, equal and alternate chambers for water or steam and the heating or cooling fluids, substantially as set forth.

5. In steam generators or condensers, three or more corrugated walls between which are two or more chambers, the corrugations of one wall being in a diverse direction to the corrugations of the adjacent walls and so that the apices of the corrugations of one wall are in contact at the crossing-points with the apices of the corrugations of the adjacent walls, these walls being laid in contact with each other and coiled or rolled spirally together so that the apices of the corrugations of the exterior surfaces of the said walls are brought into contact, the adjacent exterior corrugations extending in diverse directions, thereby forming adjacent, equal and alternate communicating passages in each chamber for water or steam and for the heating or cooling fluids, and an inclosing exterior case and inlet and outlet tubes to and from such chambers, substantially as set forth.

FREDRIK LJUNGSTROM.

Witnesses:
  E. S. BREWER,
  WM. A. MARSHALL.